No. 879,385. PATENTED FEB. 18, 1908.
A. H. HOYT.
ELECTRICAL MEASURING INSTRUMENT.
APPLICATION FILED JULY 9, 1904.
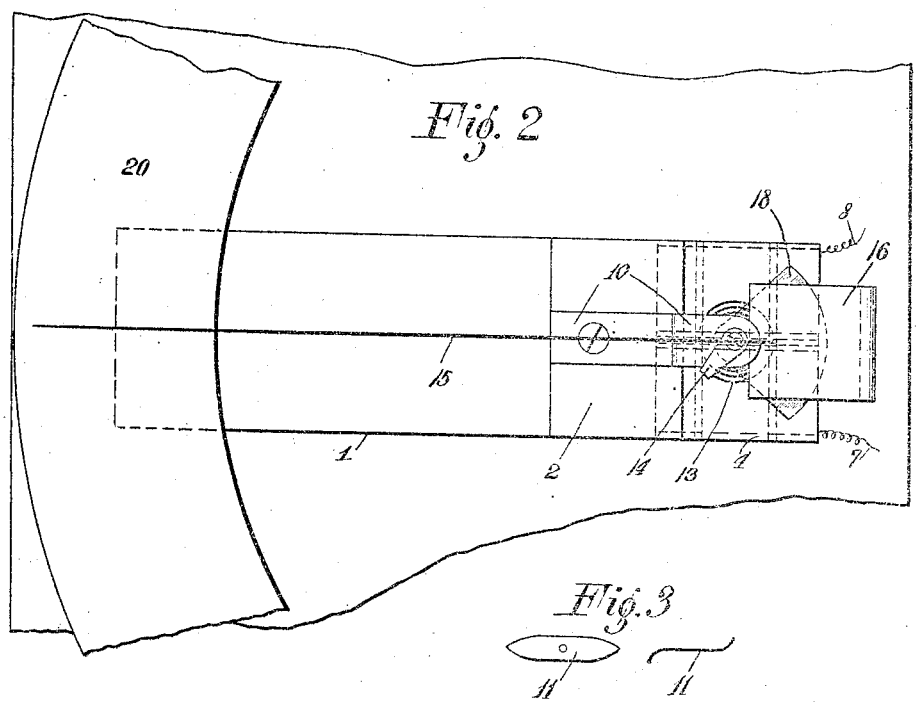
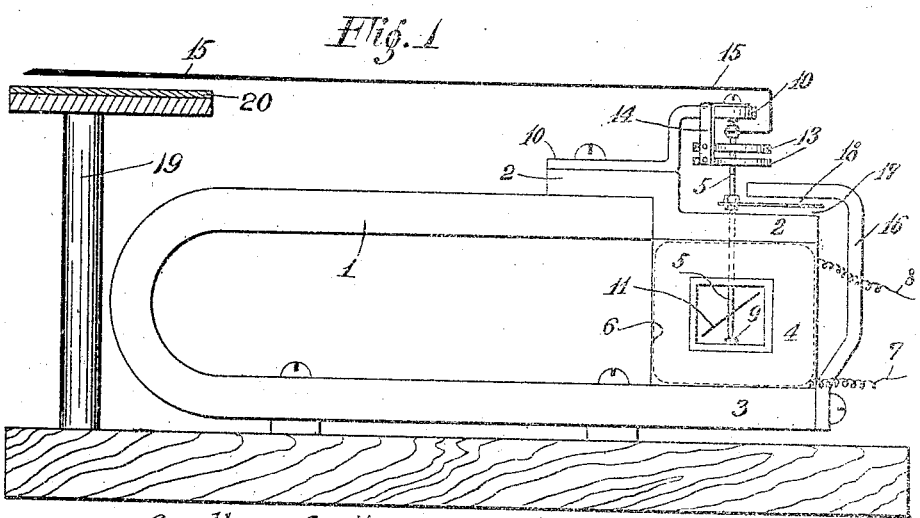
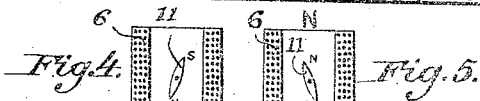

UNITED STATES PATENT OFFICE.

ADRIAN H. HOYT, OF PENACOOK, NEW HAMPSHIRE, ASSIGNOR TO WHITNEY ELECTRICAL INSTRUMENT COMPANY, A CORPORATION OF NEW YORK.

ELECTRICAL MEASURING INSTRUMENT.

No. 879,385.     Specification of Letters Patent.     Patented Feb. 18, 1908.

Application filed July 9, 1904. Serial No. 215,865.

*To all whom it may concern:*

Be it known that I, ADRIAN H. HOYT, citizen of the United States, residing at Penacook, in the county of Merrimack and State of New Hampshire, have invented certain new and useful Improvements in Electrical Measuring Instruments, of which the following is a full, clear, and exact specification.

My invention relates to instruments for indicating the presence or measuring the strength of electric currents, and belongs to that class of electrical measuring instruments in which the current to be measured passes through a stationary coil and influences a relatively small and delicately poised body of magnetic material that is inductively magnetized by a stationary permanent or electromagnet. In instruments of this class as heretofore constructed, such for instance as that which is shown in a prior patent granted to me on May 16th, 1893, bearing Serial #497,522, the permissible angular rotation of the poised magnetic substance has been limited to ninety (90) degree or less, and in order to obtain maximum sensibility, it was necessary to decrease the strength of the field provided by the magnet in order to thus reduce the restoring force, which tended to bring the moving mass with its attached pointer back to its starting or zero position, to a minimum. The instruments of this class as heretofore constructed have the further disadvantage that the indicating needle actuated by the movable magnetic body would oscillate for some time before coming to rest, or in other words, that they give indications which are not dead beat.

Briefly, my invention consists in arranging the movable magnetic element in such a manner that, while it is polarized by the stationary magnet, the influence of the stationary magnet does not tend to cause the movable member to assume any fixed position relative thereto, and in providing an external directive force, such as helical springs, which offer an increasing resistance to the motion of the needle actuated by the moving member as the needle moves from the zero point of the scale along the scale. In other words, whereas in older instruments of this type the stationary magnet not only polarized the movable magnetic element but furnished the force which opposed the motion of that element, in my present invention the stationary magnet does not perform the latter function and I am hence able to obtain high sensibility, not by weakening the stationary magnet but by proportioning it so that it will supply an intense magnetic field which will magnetically saturate the moving element. Further than this, the movable element in my improved instrument can rotate through an angle of nearly one hundred and eighty (180) degrees; and, still further, I am able by a simple expedient to dampen the oscillations of the movable element. As the magnetic field in which the movable magnetic element is located is of great strength and as the magnetic element is magnetically saturated, it is evident that the instrument will suffer but slight disturbance from external magnetic fields such as may be due to other magnets or to current carrying conductors in the neighborhood.

The invention will be more particularly described with reference to the accompanying drawings, in which Figure 1, is a side view of the working parts of an instrument embodying the invention, Fig. 2, is a plan view of the same, and Fig. 3, shows alternative shapes for the movable magnetic element. Figs. 4 and 5 are diagrams showing the movement of the polarized element.

Like figures of reference apply to like parts.

To the permanent magnet 1 is suitably secured by screws or otherwise an iron or other magnetic extension 2 forming one of the poles of the magnet. The opposite pole is designated 3. Between the poles 2 and 3 is located a suitable spool or bobbin 4 on which there is wound in a plane parallel to the axis of the shaft 5 and to the plane of the paper, the coil 6 through which is passed the current to be measured.

7 and 8 represent the terminals of the coils. The spool 4 is preferably made of two halves to permit of the easy introduction of the shaft 5. Suitably located and preferably within the spool 4 is a pivot bearing 9 for the lower extremity of the shaft 5; the upper end of said shaft being similarly pivoted on a bearing provided in bracket 10. The shaft 5 carries, diagonally mounted as shown in the drawings, a short strip of magnetic material 11 (preferably iron) a sector of conducting material 18 (preferably aluminium), volute springs 13 preferably wound in opposite directions, one extremity of the springs being rigidly secured to the shaft 5 and the other extremity to an abutment 14, and a pointer 15 for indicating the extent of the rotation of the shaft. I may obviously substitute for the volute springs 13, spiral springs or I may use weights or any other of the well known equivalents for furnishing a force to oppose the motion of the pointer, which force increases in strength as the degree of deflection increases. Secured to one extremity of the magnet is a strap 16 of magnetic material so shaped as to provide a quite intense magnetic field at 17 between its lower face and the upper face of the extension 2. In this gap, the sector 18 attached to 5 swings. 19 is a support carrying a scale 20 suitably graduated. The instrument is mounted on a suitable base plate.

It will be seen that whatever the position of the needle 15 relative to its scale 20, and hence of the movable element 11 to the stationary magnet 1 and its pole pieces 2 and 3, the distance between the extremities of the element 11 and of the face of the magnet 1 and its pole is the same, and hence no force is exerted by the magnet to bring the movable element to or hold it in a definite position. The springs 13 are however so adjusted as to direct the needle to the zero mark on the scale 20. When the current to be measured passes through the coil 6 wound on the spool 4, the polarized element 11 will, according to the well understood principles of electro-magnetism, endeavor to rotate and assume a position so that its direction of magnetization will correspond with the direction of magnetic flux through the coil, and the force with which it tends to rotate constitutes a measure of the current strength. That force is opposed by the directive force of the springs 13 or their equivalent, and, as that force is of a different magnitude for each different position of the pointer 15, each of the different pointer positions will correspond to some definite current strength, and the scale can hence be suitably graduated to indicate these current strengths. As is well understood the instrument should be wound with many turns of small diameter wire when used for the measurement of electrical potentials, and with few turns of a conductor of large cross section when used for the measurement of electrical currents. As the position of the element 11 relative to the stationary coil of wire 6 may be made such, with due regard to the polarity of the element, that it must rotate about its axis nearly one hundred and eighty degrees before its direction of magnetization will correspond with the direction of magnetic flux through the coil, it is obvious that the pointer 15 may be caused to swing over a scale of an arc of nearly one hundred and eighty (180) degrees.

Figs. 1 and 2 indicate the position of the parts when the pointer is approximately at its mid position. Fig. 4 indicates in diagram a horizontal section of coil 6 and a plan view of the inclined polarized element 11 on its vertical shaft 5. The polarity of the element 11 may be as indicated and for the position shown in Fig. 4, the pointer may be considered at or near the zero position. When current passes through coil 6, it is in such a direction that the flux created thereby causes the element 11 to turn on its pivot and when near its maximum deflection the element 11 will assume a position substantially that indicated in Fig. 5, the element 11 having swung through an arc of nearly 180 degrees.

Dampening of the oscillations of the moving system in my instrument is accomplished in that, when the sector 18 of aluminium or other conducting material rigidly attached to the shaft 5, swings in the gap 17 eddy currents are set up therein in the well known manner. It is obvious that instead of making the element 11 straight and mounting it at an angle on the shaft 4, I may curve it as in Fig. 3.

The device above described may be modified in various respects without departing from the invention and I therefore desire it to be understood that I do not herein limit myself to the specific construction shown.

Having thus described my invention, I declare that what I claim as new and desire to secure by Letters Patent, is,—

1. In an electrical measuring instrument, the combination of a magnet, a pivoted shaft, an element mounted upon said shaft in the field of force of the magnet in such manner as not to be moved thereby, a coil carrying current adapted to rotate said element, springs opposing the movement of the element, and a mass of dampening material carried by said shaft and moving in a magnetic field, substantially as described.

2. In an electrical measuring instrument, the combination of a pivoted inclined element, means for polarizing said element, mechanical means tending to hold said element in a fixed position, a coil for causing deflection of said element upon the passage of a current, and means for indicating the amount of said deflection.

3. In an electrical measuring instrument, the combination of a movable polarized element, stationary means for polarizing said element, a coil adapted to receive the current to be measured, and resilient means tending to hold said element in a position such that its magnetization opposes that of the coil when said current flows.

4. In an electrical measuring instrument, the combination of a pivoted polarized element, stationary means for polarizing said element, a fixed coil adapted to receive the current to be measured, and resilient means tending to hold said element in a position such that its magnetization opposes that of the coil when said current flows.

5. The combination of a pivoted element, stationary means for polarizing said element, a fixed coil adapted to receive the current to be measured, resilient means tending to hold said element in a position such that its magnetization opposes that of the coil when said current flows, and means for dampening the movement of said element.

6. In an electrical measuring instrument, the combination of a stationary magnet, a pivoted element polarized by said magnet, a fixed coil adapted to receive the current to be measured, and resilient means tending to hold said element in a position such that its magnetization opposes that of the coil when said current flows.

7. In an electrical measuring instrument, the combination of a stationary magnet, a pivoted element polarized by said magnet, a fixed coil adapted to receive the current to be measured, the shaft carrying said element being at right angles to the axis of said coil, and means tending to hold said element in a fixed position.

8. In an electrical measuring instrument, the combination of a stationary magnet, a pivoted element polarized by said magnet, a fixed coil adapted to receive the current to be measured, the axis on which said element rotates being at right angles to the axis of said coil, and resilient means tending to hold said element in a position such that its magnetization opposes that of the magnetization of the coil when said current flows.

9. In an electrical measuring instrument, the combination of a stationary magnet, a pivoted element polarized by said magnet, a fixed coil adapted to receive the current to be measured, the axis on which said element rotates being at right angles to the axis of said coil, resilient means tending to hold said element in a position such that its magnetization opposes that of the coil when said current flows, and means for dampening the movement of said element.

10. The combination of a magnet having two arms one vertically above the other, an inclined element polarized by said magnet and adapted to turn about a vertical axis, a stationary coil adapted to receive the current to be measured, the axis of said coil being at right angles to the vertical axis of said element, and resilient means tending to hold said element in a position such that its magnetization opposes that of the coil when said current flows.

11. The combination with two arms of a stationary magnet, of an element adapted to rotate about an axis at right angles to said arms, said element being inclined in the direction of magnetic flux between said arms, a stationary coil adapted to receive the current to be measured, the axis of said coil being at right angles to the axis about which said element rotates, and means tending to hold said element in a fixed position.

In testimony whereof I affix my signature, in presence of two witnesses.

ADRIAN H. HOYT.

Witnesses:
J. A. MASSIE,
HORACE B. SHERBURNE.